(12) United States Patent
Bower

(10) Patent No.: US 12,195,134 B1
(45) Date of Patent: Jan. 14, 2025

(54) BICYCLE FRAME

(71) Applicant: Earle S. Bower, Greensboro, NC (US)

(72) Inventor: Earle S. Bower, Greensboro, NC (US)

( * ) Notice: Subject to any disclaimer, the term of this patent is extended or adjusted under 35 U.S.C. 154(b) by 0 days.

(21) Appl. No.: 18/624,224

(22) Filed: Apr. 2, 2024

Related U.S. Application Data

(60) Provisional application No. 63/550,773, filed on Feb. 7, 2024.

(51) Int. Cl.
*B62K 3/02* (2006.01)

(52) U.S. Cl.
CPC ..................... *B62K 3/02* (2013.01)

(58) Field of Classification Search
CPC .......... B62K 3/02; B62K 19/24; B62K 15/00; B62K 15/006; B62K 2015/001; B62K 2206/00; B62K 13/00; B62K 13/08
USPC ................................................. 280/278, 287
See application file for complete search history.

(56) References Cited

U.S. PATENT DOCUMENTS

| | | | | |
|---|---|---|---|---|
| 403,153 A * | 5/1889 | Smith | ..................... | B62K 13/00 280/7.11 |
| 529,861 A * | 11/1894 | Hersh | ..................... | B62K 13/00 280/7.11 |
| 591,673 A * | 10/1897 | Maltby | .................. | B62K 13/00 280/7.11 |
| 604,838 A * | 5/1898 | Nagell | .................. | B62K 13/00 280/7.11 |
| 615,768 A * | 12/1898 | Wagner | .................. | B62K 13/00 280/7.11 |
| 620,459 A * | 2/1899 | Koehler | ................. | B62K 13/00 280/7.11 |
| 638,396 A * | 12/1899 | Laviers | .................. | B62K 13/00 280/7.11 |
| 1,279,081 A * | 9/1918 | Brook | ..................... | B62K 13/00 280/7.11 |
| 1,744,417 A * | 1/1930 | Schwartz | ............... | B62K 13/00 280/301 |
| 2,227,252 A * | 12/1940 | Giambra | ................ | B62K 13/00 280/7.11 |
| 2,827,301 A * | 3/1958 | Stevens | ..................... | B62K 3/04 280/281.1 |
| 2,927,307 A | 3/1958 | Stevens | | |
| 2,997,308 A * | 8/1961 | Boudreau | .............. | B62K 19/24 280/7.11 |
| 3,088,747 A * | 5/1963 | Hahn | ..................... | B62K 13/00 280/7.11 |

(Continued)

OTHER PUBLICATIONS

Wikipedia, "Rod end bearing," published at 01:52, Jul. 25, 2019, available at https://en.wikipedia.org/w/index.php?title=Rod_end_bearing&oldid=907754691 (Year: 2019).*

(Continued)

*Primary Examiner* — Christopher B Wehrly
(74) *Attorney, Agent, or Firm* — MacCord Mason PLLC

(57) ABSTRACT

A bicycle having an increased mounting area is shown and described. In one embodiment, a bicycle includes a top tube. In another embodiment, a bicycle includes a drop tube frame. Other examples include a bicycle including a frame having a top tube hinged at one end and releasably connected to another end for easier mount and dismount of the bike. Methods for easier bicycle mount and dismount are also included.

5 Claims, 16 Drawing Sheets

(56) References Cited

U.S. PATENT DOCUMENTS

| | | | | | |
|---|---|---|---|---|---|
| 3,550,995 | A | * | 12/1970 | Quisenberry | B62K 13/08 |
| | | | | | 280/7.11 |
| 3,552,995 | A | | 1/1971 | Quisenbery | |
| 3,700,251 | A | * | 10/1972 | Boucher | B62K 13/00 |
| | | | | | 280/7.11 |
| 4,045,048 | A | * | 8/1977 | Irwin | B62K 9/02 |
| | | | | | 280/278 |
| 5,558,349 | A | * | 9/1996 | Rubin | B62H 5/00 |
| | | | | | 280/287 |

OTHER PUBLICATIONS

"Rod end bearing" Wikipedia; https://en.wikipedia.org/w/index.php?title=Rod_end_bearings&oldid=907754691.

\* cited by examiner

BICYCLE FRAME

FIELD OF THE TECHNOLOGY

The present disclosure relates generally to bicycles, and more particularly to improved bicycle devices, assemblies, and methods for adjustable bicycle frames for ease of use and mounting/dismounting, and in other examples, to a bike frame having an articulating top tube.

BACKGROUND

Bicycling is a very popular form of exercise and aerobic workout for all levels of athlete and for those of all ages. To mount many bicycles, a user must swing a leg over the uppermost part of the bike, and occasionally over the bike saddle as well. For many, the proper bike height can make it difficult for mounting the bike with such a corresponding upper height. Dismounting can be equally as difficult and often results in standing in a precariously awkward position, for example, on one's tip toes or leaning backwards to swing a leg over the top of the bike.

Step-through frame bikes offer somewhat lower clearance, however, they do not solve the issue recognized by Applicant. Many riders do not like the step-through frame option and many step-over bikes still require a top clearance for mounting that is difficult, especially for example for the young, small in stature, and older riders. Additionally, step-through frame cycles perform and respond differently than lightweight, responsive bikes. In some instances, to compensate for the absence of a top tube, step-through bikes must either use larger, heavier tubing and/or additional tubing lower down between the top and down tubes. As a result, step-through bikes are less nimble and can result in a less desirable ride.

Therefore, Applicant desires apparatus, systems, and methods for a bicycle to improve accessibility without the drawbacks presented by the traditional systems and methods.

SUMMARY

In accordance with the present disclosure, bicycle devices, systems, and methods are provided for a bicycle having a drop tube frame. This disclosure provides improved bicycle apparatus, systems and methods that are convenient, efficient, economical, light weight, and safe for the user, without compromising ride quality or feel.

One embodiment of the present disclosure includes a bicycle ("bike") having a frame. The frame may be a drop frame. A drop frame, in some examples, may be a bicycle frame with an adjustable top bar. The top bar may be raised, lowered and/or moved sideways, or any direction out of alignment with the frame position as in use.

In some examples, a drop frame may include a top bar having a removable portion. A drop frame may generally include a top bar, a head tube adjoining a fork, a down tube, a seat tube, and/or seat stays. The bicycle may include a set of wheels, a seat, chains, handlebars, and/or any accessories typical to bicycles.

Certain embodiments may include a drop frame having a top tube. The top tube may be a folding top tube. The top tube may be an adjustable top tube. The top tube may be an articulating top tube. The top tube may be a movable top tube. The top tube may be a removable top tube. The top tube may be a hinged top tube. The top tube may, in some instances, retreat toward either a head tube or toward a seat tube.

A top tube may include a first end and a second end. A top tube may be removable at both ends, or either end. A top tube may fold downward, and alternate, from a substantially horizontal first position to a dropped second position and back. The top tube may drop at one of the ends to drop out of the way of a user mounting the bike. The top tube may be secured back in the first position after the user has mounted the bike. The top tube may be secured in the horizontal first position to provide a stable, secure ride, as with a non-movable top tube. The top tube may include a front portion, a movable portion, and/or a back portion. In certain examples, the top tube movable portion is located between a front portion and a back portion.

Examples may include a bicycle having a bicycle frame. The bicycle frame may include a top tube that is displaceable from the frame in at least one place. The top tube may form a riding plane in a first position and a mounting plane in a second position. The top tube may alternate between the first position and the second position. In some cases, the mounting plane is lower on the bicycle frame than the riding plane, forming a larger mounting space.

In other embodiments, a bicycle frame includes a top tube including a first end and a second end, the top tube hinged at the first end, and the top tube releasably connected at the second end for easier mount and dismount of the bike.

Embodiments include a bicycle having a variable mounting space. The bicycle including a bicycle frame having a top tube. The top tube may include a first end and a second end, a front portion, a movable portion, and a back portion. At least one of the first end or the second end may include a separation point. The other of the first or second end may drop out of alignment with the top tube, such that the movable portion lowers to decrease the step over height requirement.

In some examples, a bicycle frame includes a pivotal tube member. The tube member may include a pivotal proximate end and an opposing releasable distal end. The pivoting proximate end may be adapted to pivot freely from a substantially horizontal riding position. And in certain embodiments the pivoting proximate end may be adapted to pivot freely from a substantially horizontal riding position to an independent lowered, and in some examples substantially perpendicular, dismount position.

Examples of a bicycle frame may include a top tube member including a linkage assembly having a length spatially offsetting a pivot proximate end from a releasable distal end. Other examples may include a top tube member in a pivotable tube assembly, the top tube having an elongated body separating a hinge end and a release end. A bicycle frame may include a handle assembly, a seat assembly, and a pivotable tube member. The pivotable tube member may space apart the handle assembly and the seat assembly. The pivotable tube member may space apart the handle assembly and the seat assembly free of a fixed position. The pivotable tube member may adjoin with the handle assembly and the seat assembly and a fixed riding position and also in a free mounting position.

In certain examples, a top tube may be a pivotable tube member being rotatable relative to the frame.

A bicycle frame may have an articulating top tube. The bicycle frame may include a fastener that secures the top tube to a retainer. In certain examples, a fastener may include a locking pin, a draw lock, and/or in other examples may include a draw latch toggle clamp fastener on the top tube. The draw latch toggle clamp may extend along the top tube 30 to the retainer 35 toward one end of the bike, for example, along a front end. In certain examples, a rider pulling down on a lever, a pressure may be exerted on the retainer, securing the retainer to the top tube.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1A:
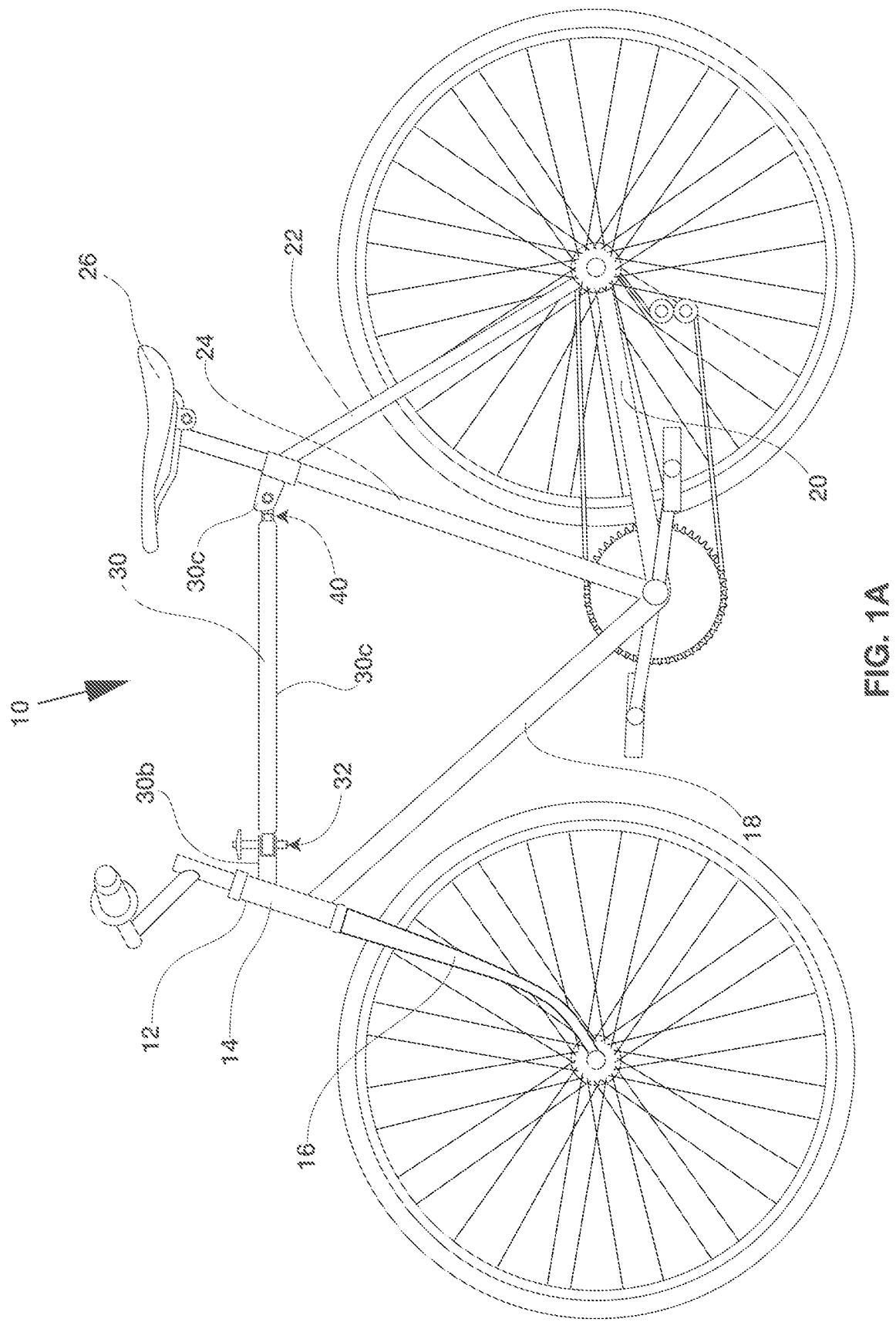
FIG. 1A is a side view of one example of a bicycle having a drop tube frame according to an embodiment of the disclosure.
Figure 1B:
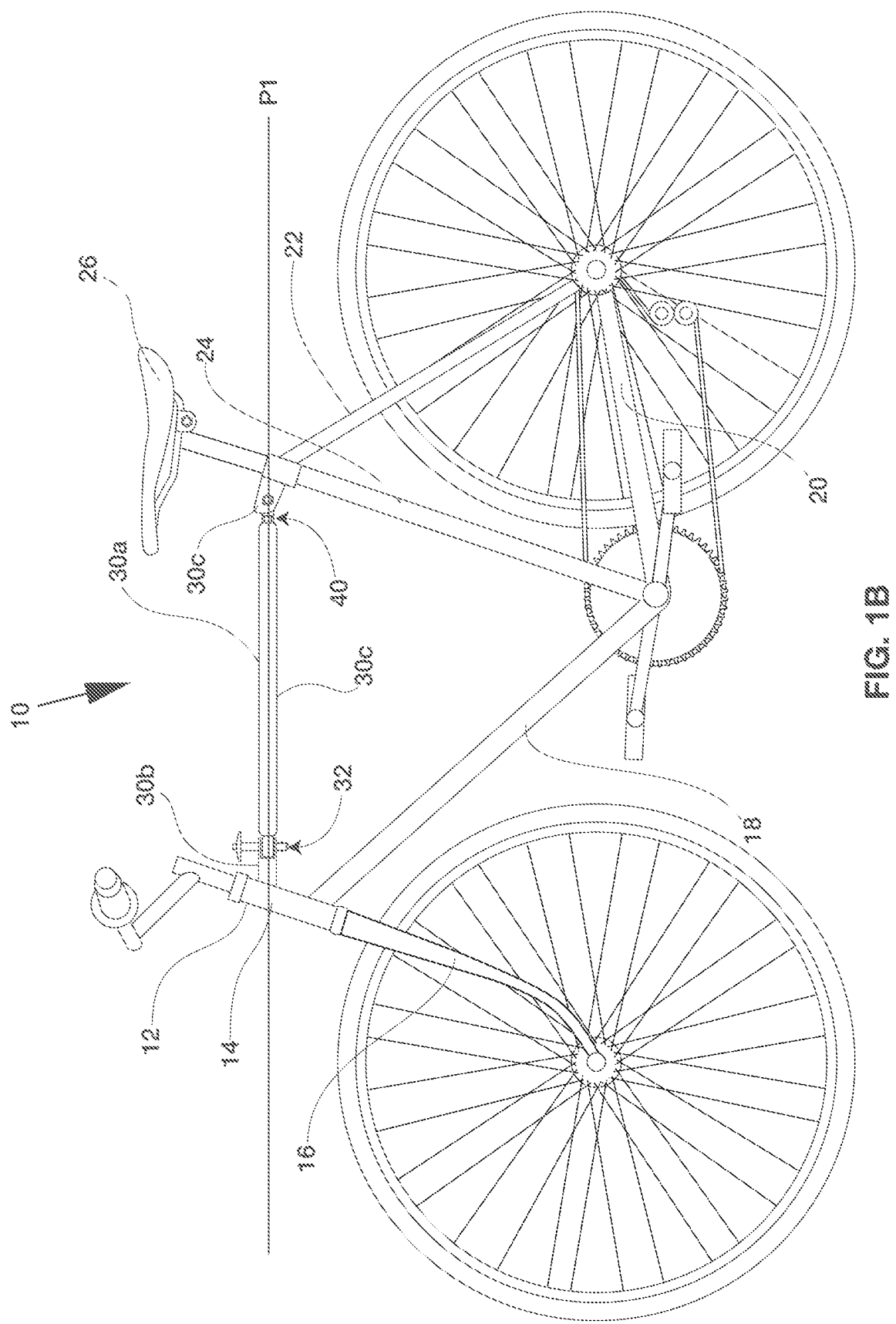
FIG. 1B is another side view of one example of a bicycle having a frame with a movable top tube according to an embodiment of the disclosure.
Figure 2A:
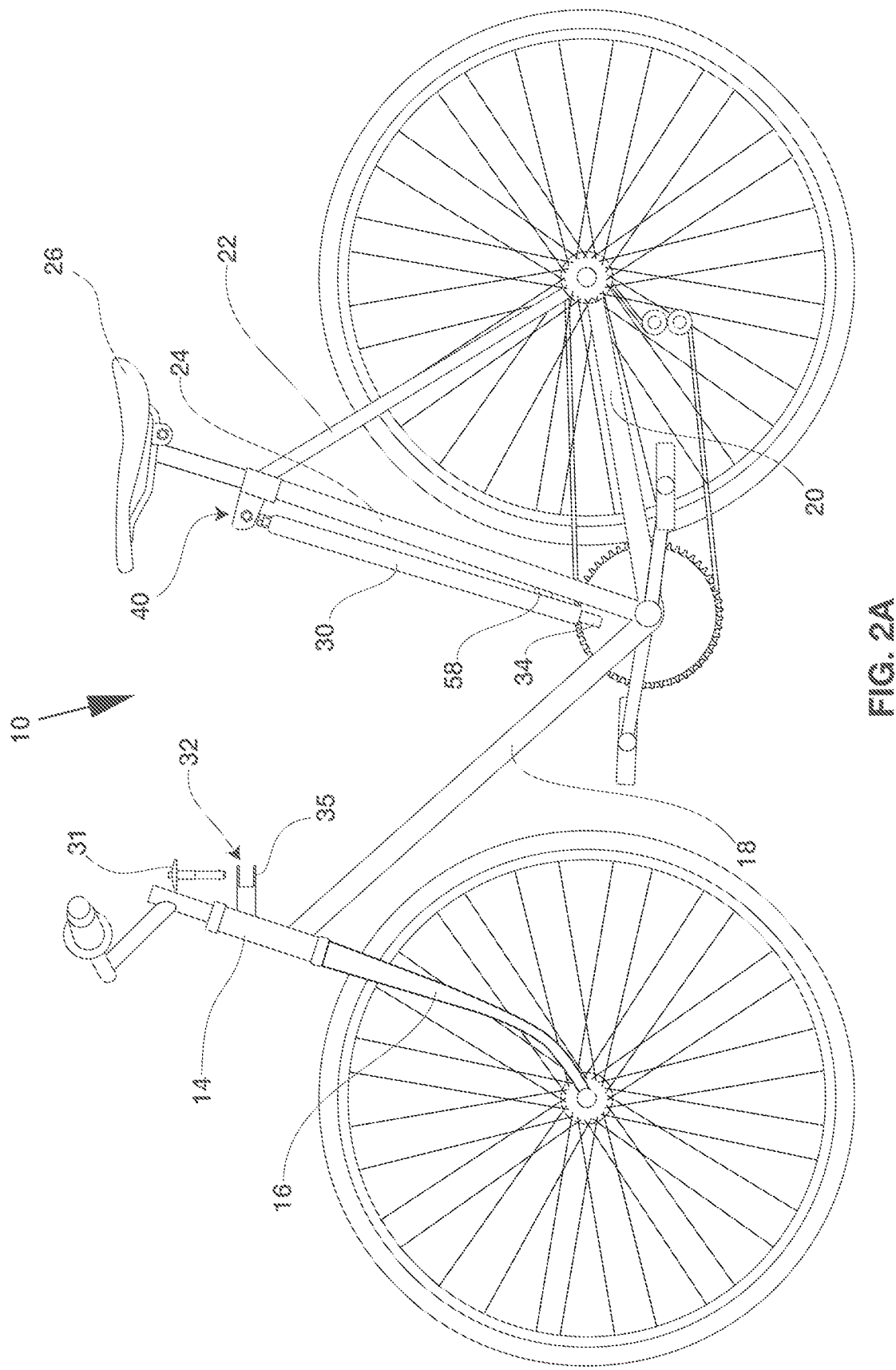
FIG. 2A is a side view of one example of a bicycle having a top tube and showing an alternative positioning of the top tube in a drop position according to embodiments of the present disclosure.
Figure 2B:
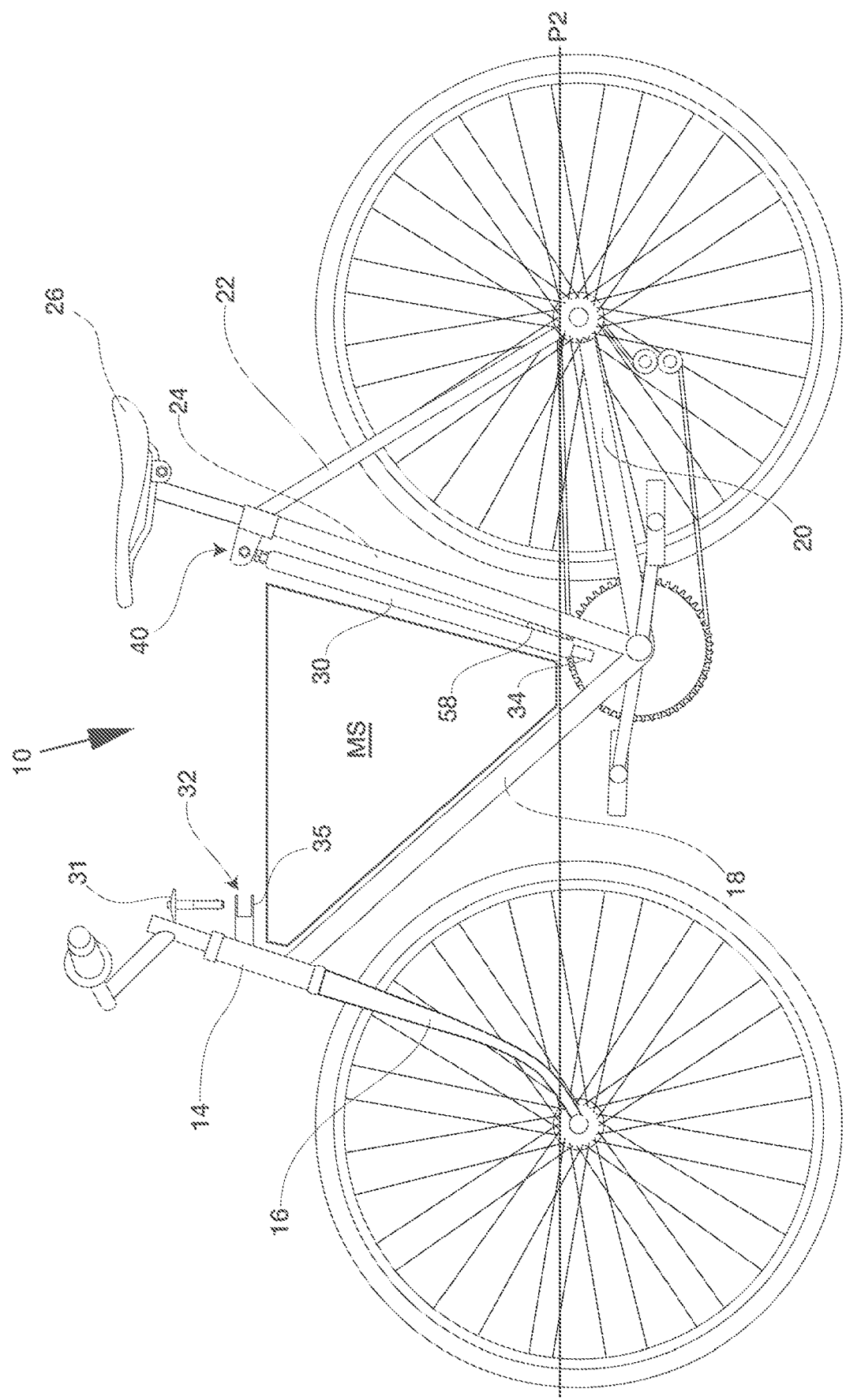
FIG. 2B is a side view of one example of a bicycle having a top tube and showing an alternative positioning of the top tube in a drop second position according to embodiments of the present disclosure.
Figure 2C:
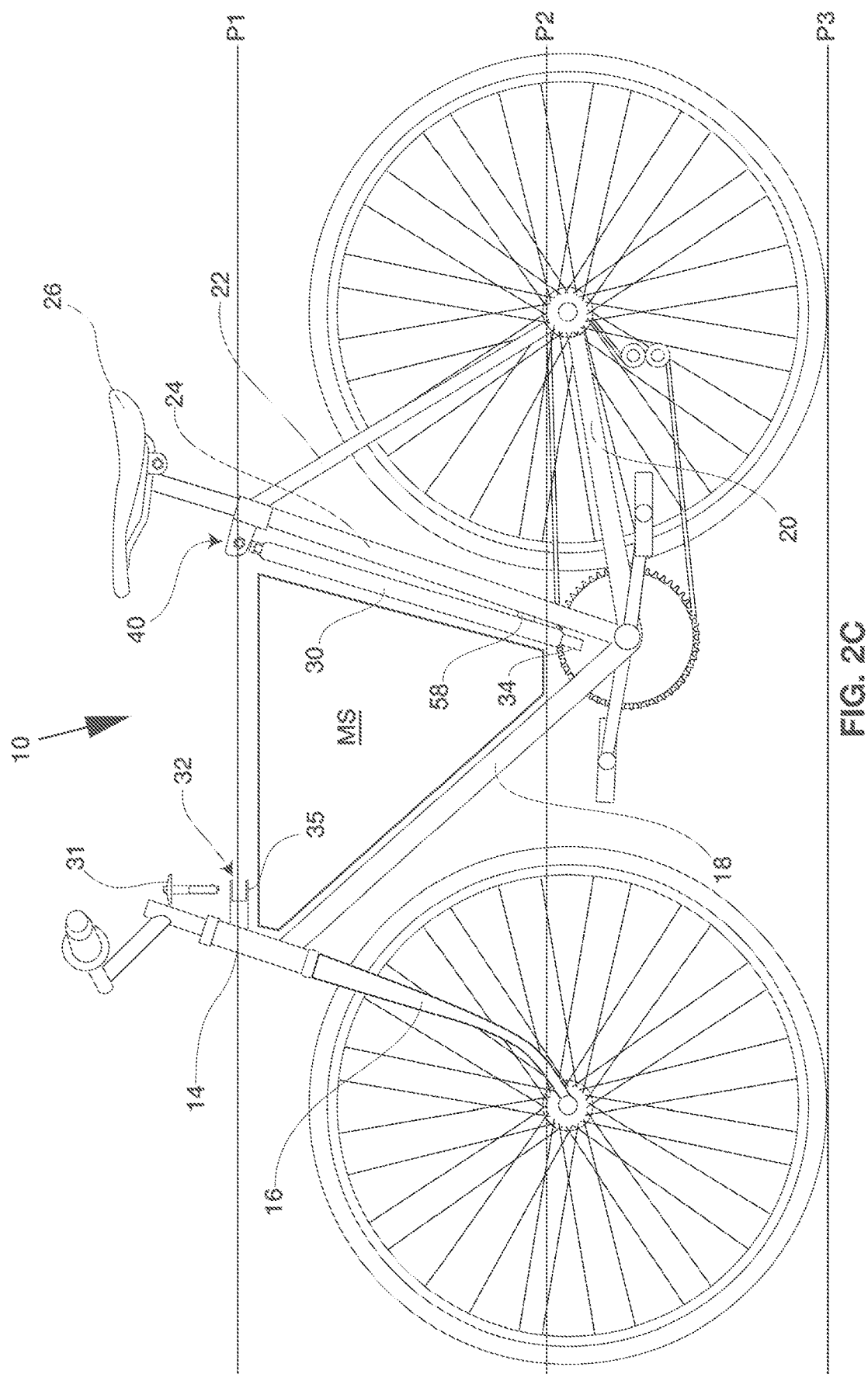
FIG. 2C is a side view of one example of a bicycle having a top tube and showing an alternative positioning of the top tube in a drop position, along with distances and planes along the bike frame according to embodiments of the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing embodiments of the disclosure and are not intended to limit the disclosure or any invention thereto.

In FIGS. 1A through 2C is shown a bicycle ("bike") 10 having a frame 12. The frame 12 may be a drop frame embodied according to the present disclosure. A drop frame, in some examples, may be a bicycle frame 12 with an adjustable top bar 30. In some embodiments, the top bar 30 may be raised, lowered and/or moved sideways, or any direction out of alignment with the frame position as in use. A drop frame 12 may include a top bar 30 having a removable portion 30. A drop frame 12 may generally include a top bar 30, a head tube 14 adjoining a fork 16, a down tube 18, a seat tube 24 and/or seat stays 22. The bicycle 10 may include a set of wheels, a seat 26, chains, and handle bars.

Drop frame 12 may include a top tube 30. Top tube 30 may be a folding top tube. Top tube 30 may be an adjustable top tube. Top tube 30 may be an articulating top tube. Top tube 30 may be a movable top tube. Top tube 30 may be a removable top tube. Top tube 30 may be a hinged top tube. Top tube 30 may, in some instances, retreat toward either a head tube 14 or toward a set tube 24 in an accordion type structure and movement.

Figure 3:
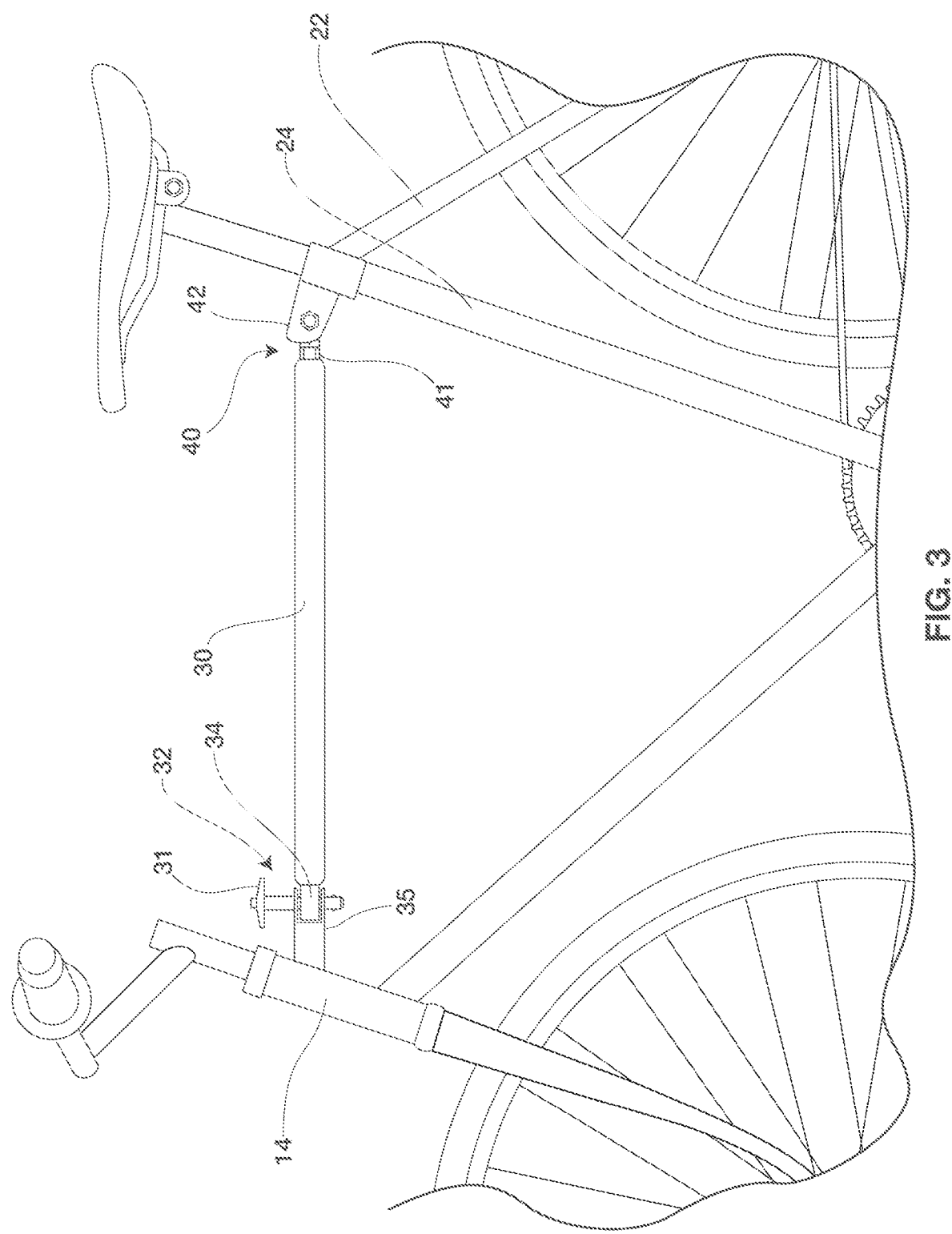
FIG. 3 is a close up side view of a portion of FIG. 1 showing an example of a bicycle frame according to one example of the disclosure.
Figure 4:
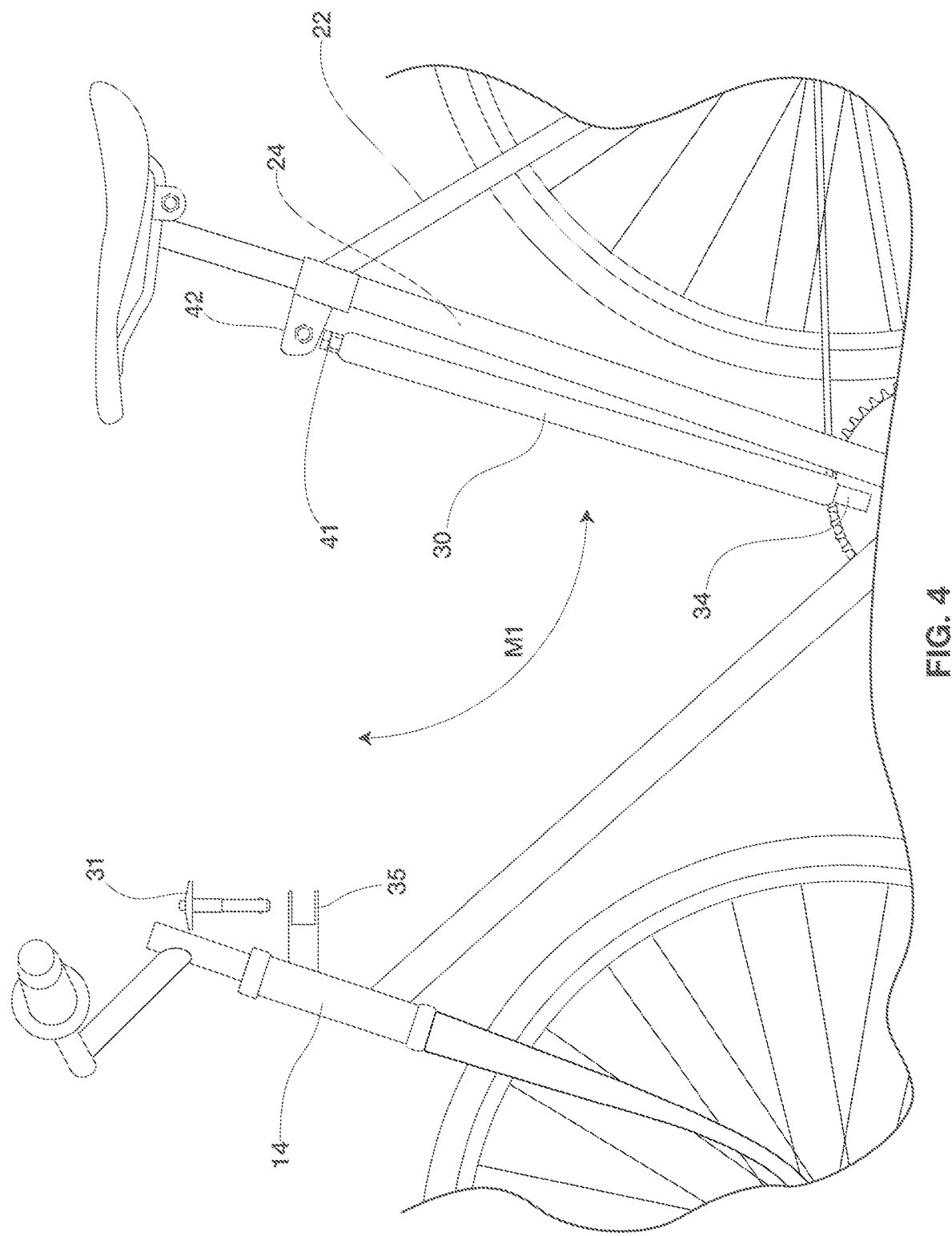
FIG. 4 is a close up side view of a portion of FIG. 1 showing one example of a top tube in a drop position according to examples of the present disclosure.

Top tube 30 may include a first end 32 and a second end 40, reference FIGS. 3 and 4. Top tube 30 may be removable at both ends 32, 40 or either end 32, 40. Top tube 30 may fold downward, for example in a motion M1, and alternate, from a substantially horizontal first position to a dropped second position and back. The top tube 30 may drop at one of the ends 32, 40 to drop out of the way of a user mounting the bike. Top tube 30 may be secured back in the first position after the user has mounted the bike. The top tube 30 may be secured in the horizontal first position to provide a stable, secure ride, as with a non-movable top tube. Top tube 30 may include a front portion 30b, a movable portion 30a, and/or a back portion 30c. In certain examples, top tube movable portion 30a is located between front portion 30b and back portion 30c.

In one embodiment, top tube 30 may include a first end 32 and second end 40, with second end 40 including a hinge and interfacing with an upper portion of the seat tube 24. The first end may interface with the head tube 14 along an upper portion of the head tube and include a receiver 35. A reversal of this configuration, with the hinged end at the first end 32 and the second end interfacing with the head tube 14 is considered within the scope of inventions of the present disclosure. The first end 32 and/or second end 40 may be considered, in some examples, a drop end.

By way of example, the top tube 30 may be hinged at the second end 40 and may drop from the horizontal, first position to the dropped, second position, shown in FIG. 3 and FIG. 4, the top tube 30 drops toward seat tube 24 when first end 32 is unsecured, along M1. Top tube 30 may drop to a vertical position where drop bar 30 may be dropped to be at least substantially parallel to seat tube 24. Top tube 30 may, in some instances, drop to rest with tube slot 34 resting along the seat tube 24. A fastener 58 (see FIG. 2A) may secure top bar 30 to seat tube 24 when top tube 30 is in a dropped position.

Figure 5:
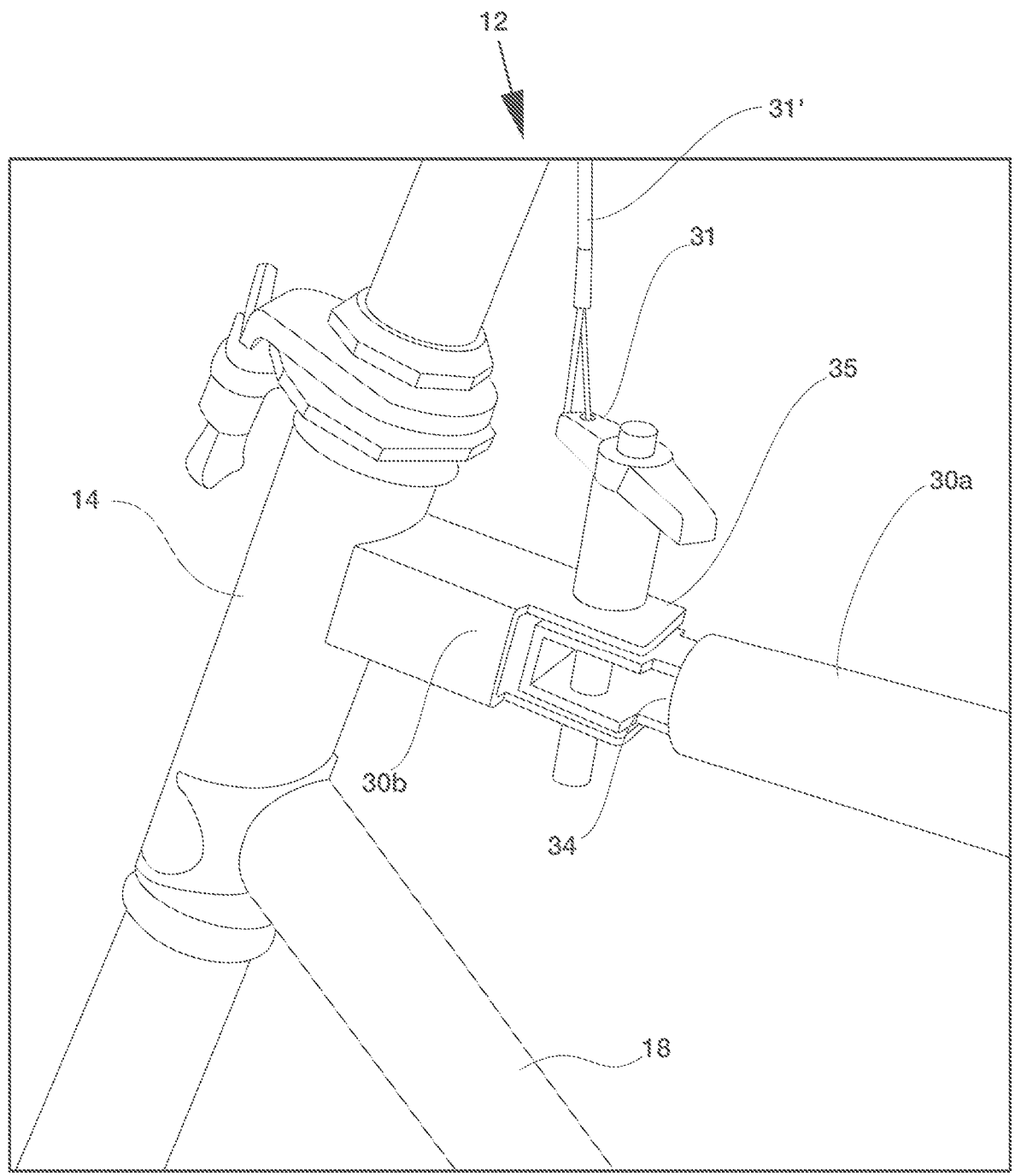
FIG. 5 shows a close up side view of one example of a first end according to one embodiment of the present disclosure.
Figure 6:
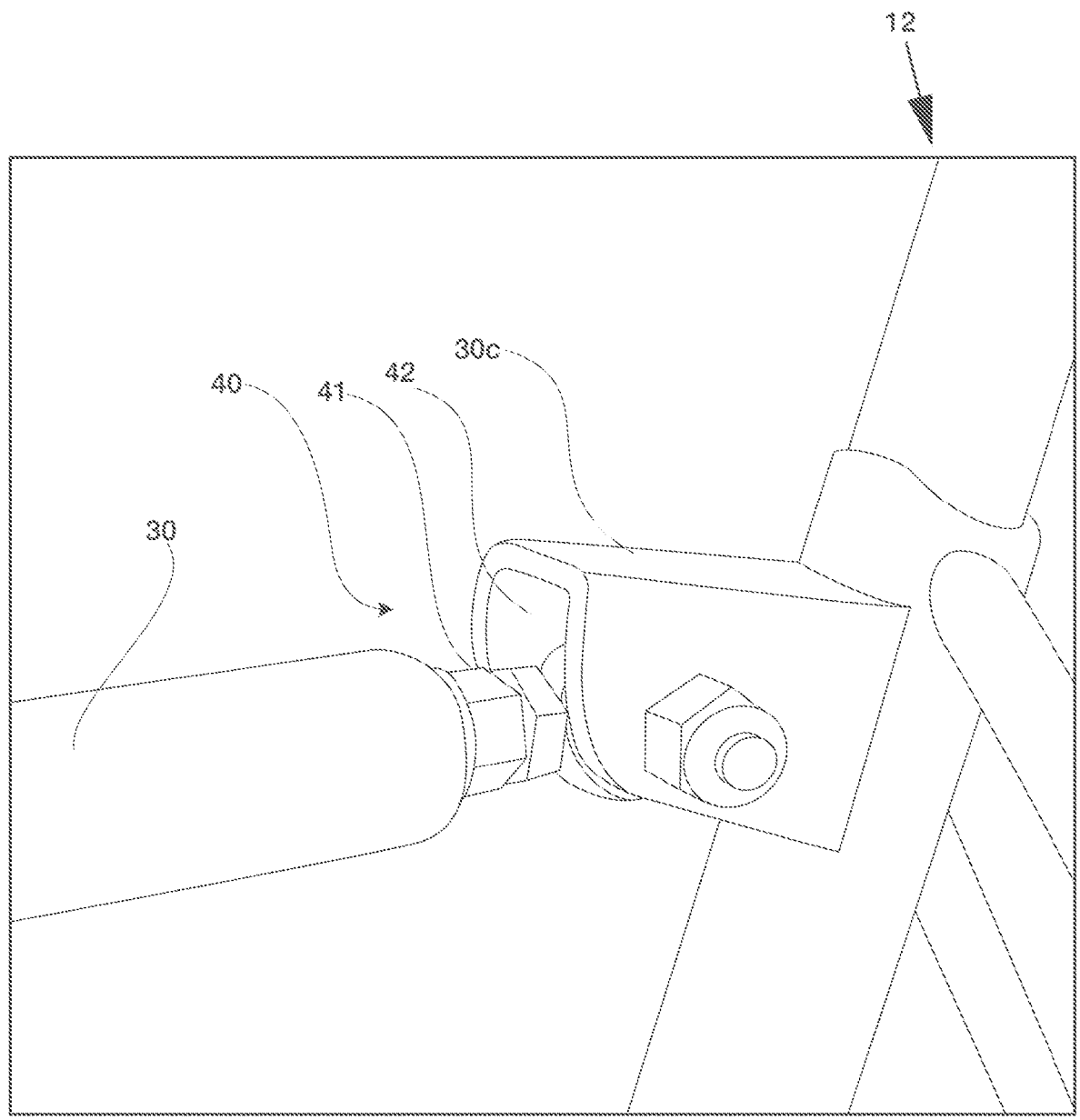
FIG. 6 shows a close up side view of one example of a second end according to one embodiment of the present disclosure.
Figure 7:
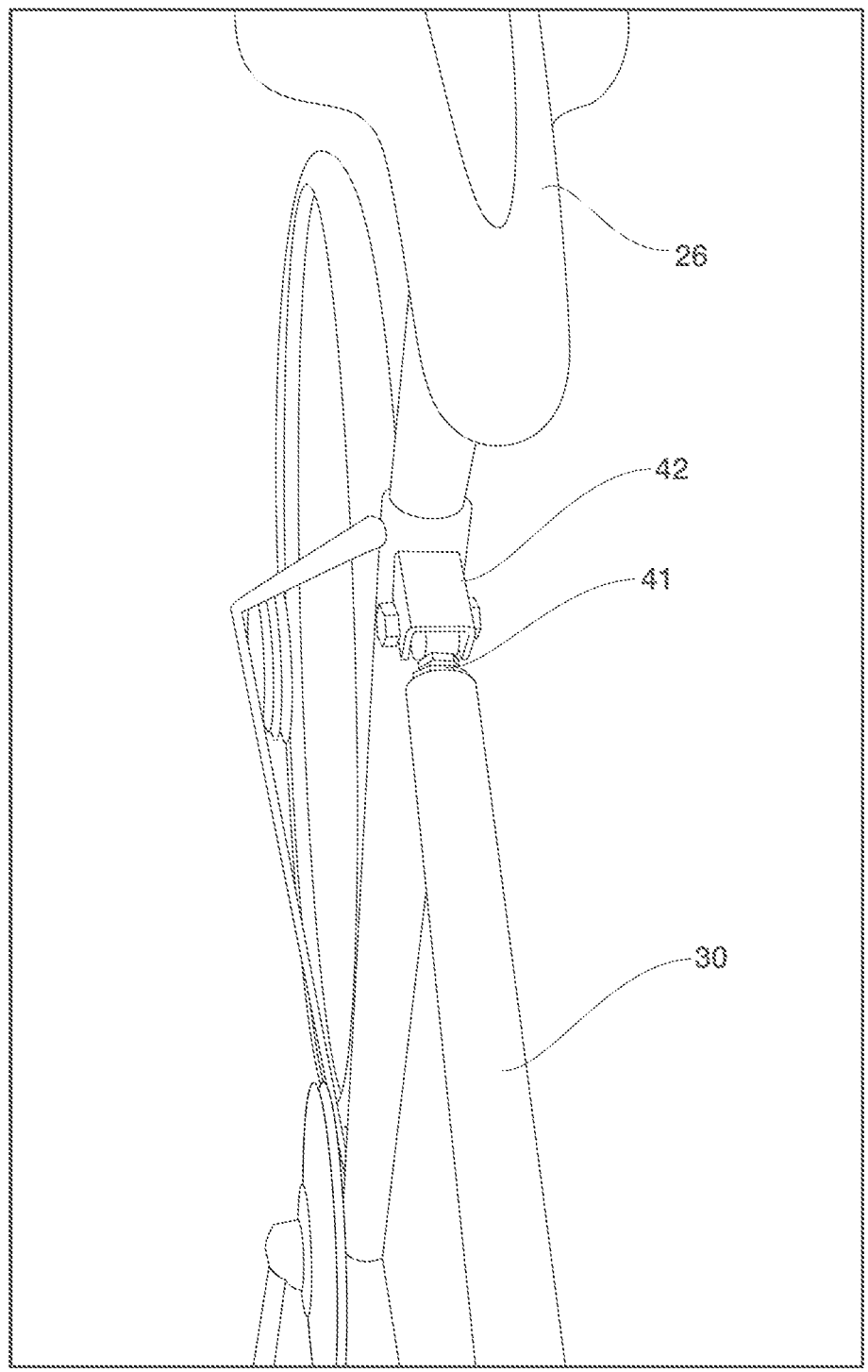
FIG. 7 shows a close up top view of one example of a second end according to one embodiment of the present disclosure.
Figure 8:
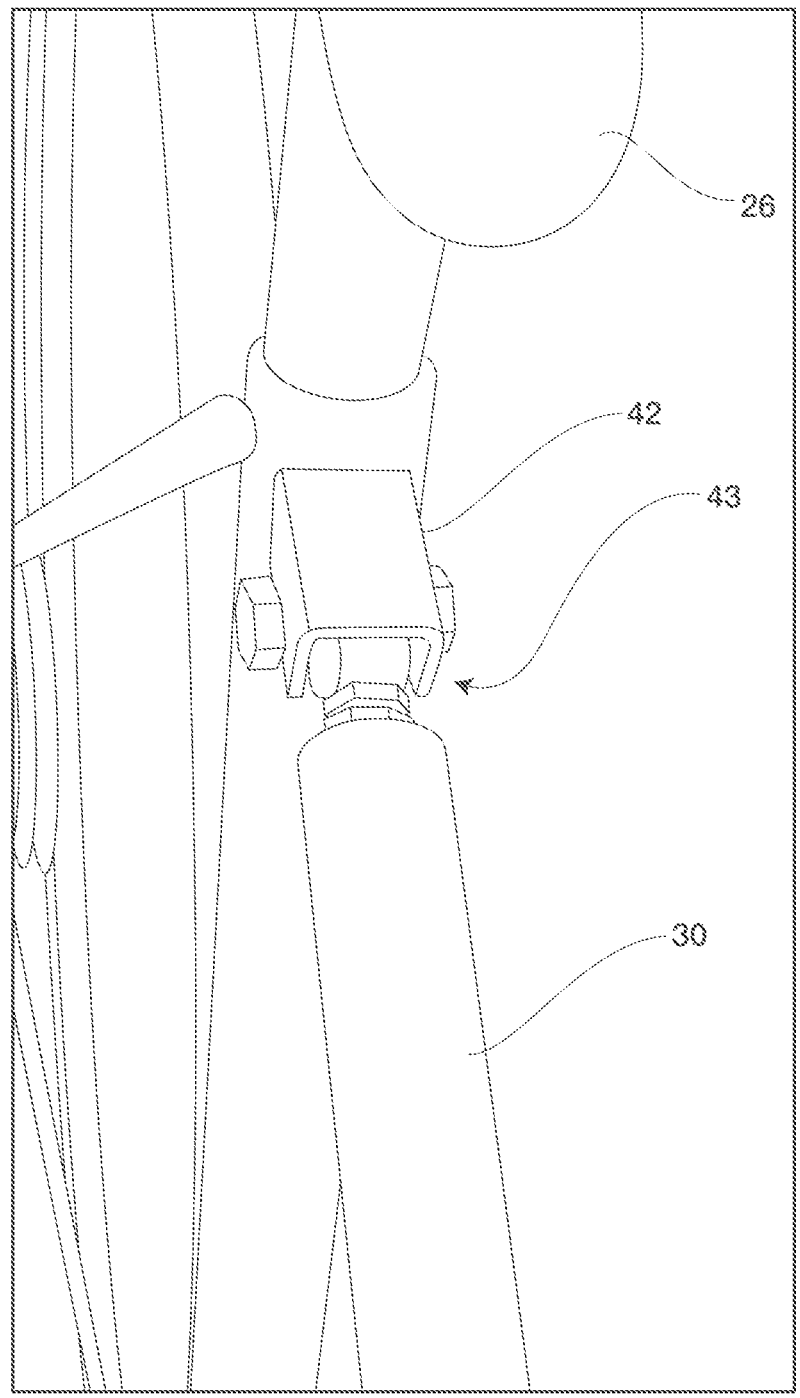
FIG. 8 shows an alternative top view of one example of a second end at a hinge joint according to one embodiment of the present disclosure.
Figure 9:
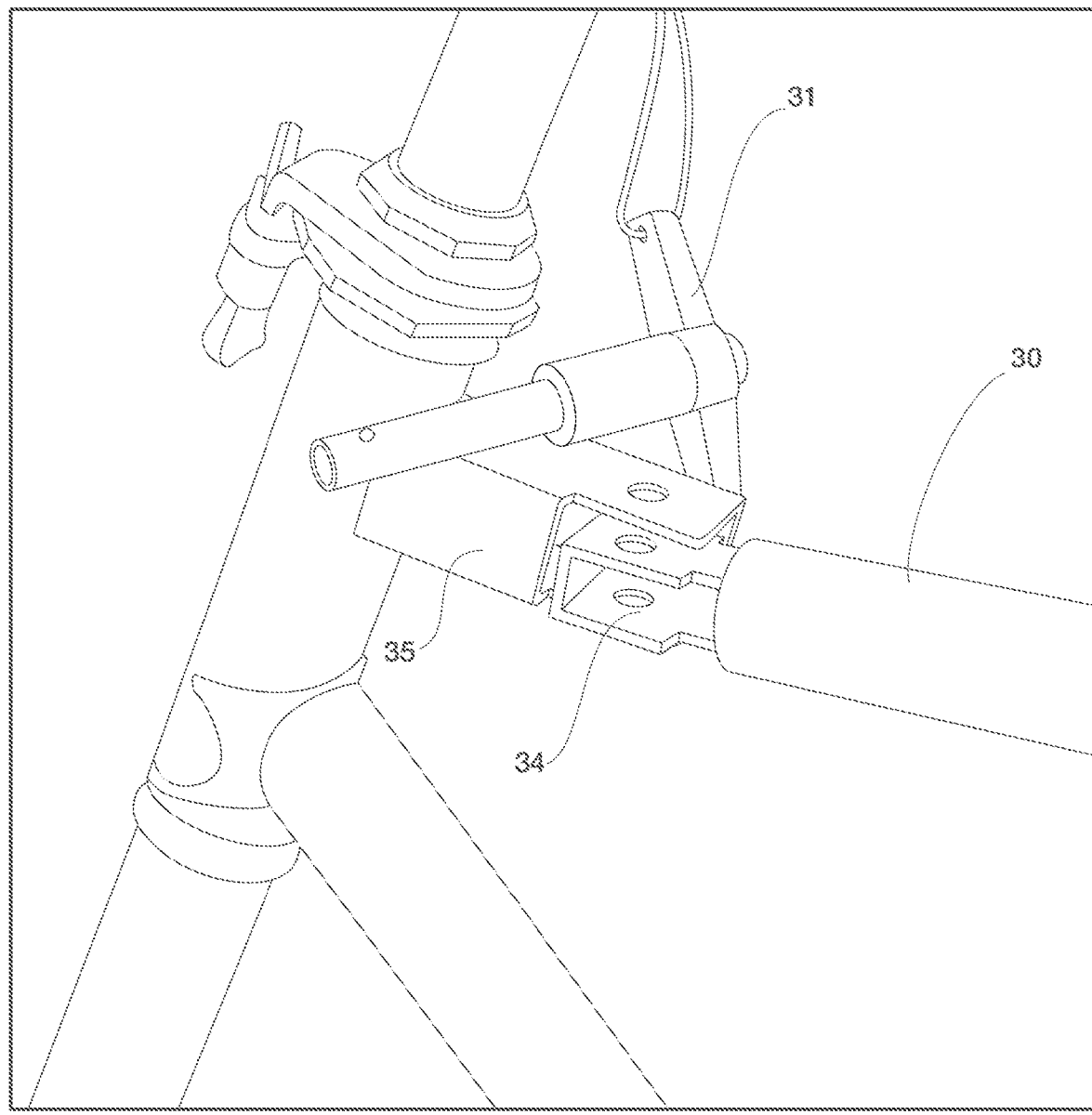
FIG. 9 shows a perspective, close up view of a first end according to embodiments of the present disclosure.
Figure 10:
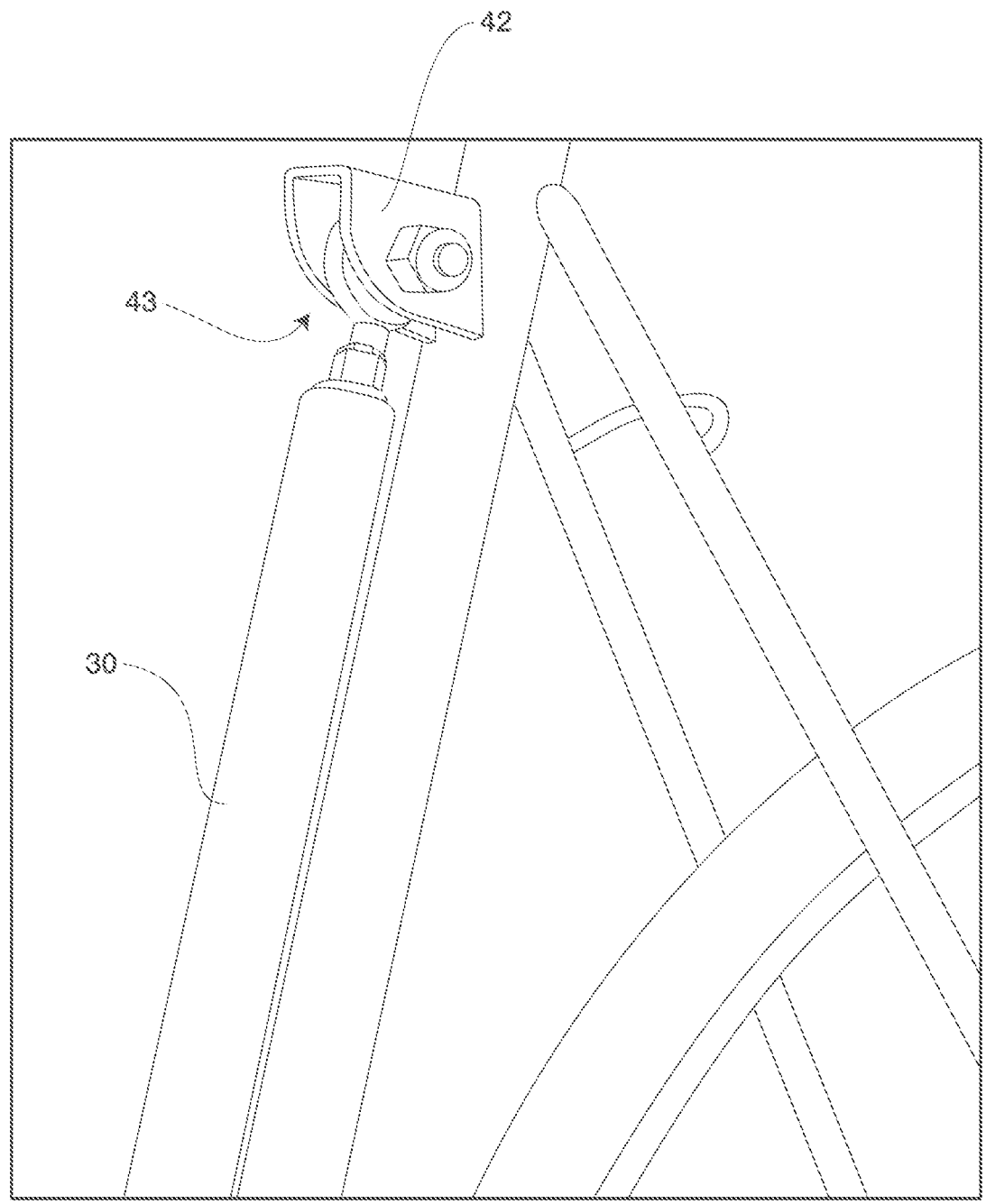
FIG. 10 shows a side perspective view of a second end according to embodiments of the present disclosure.
Figure 11:
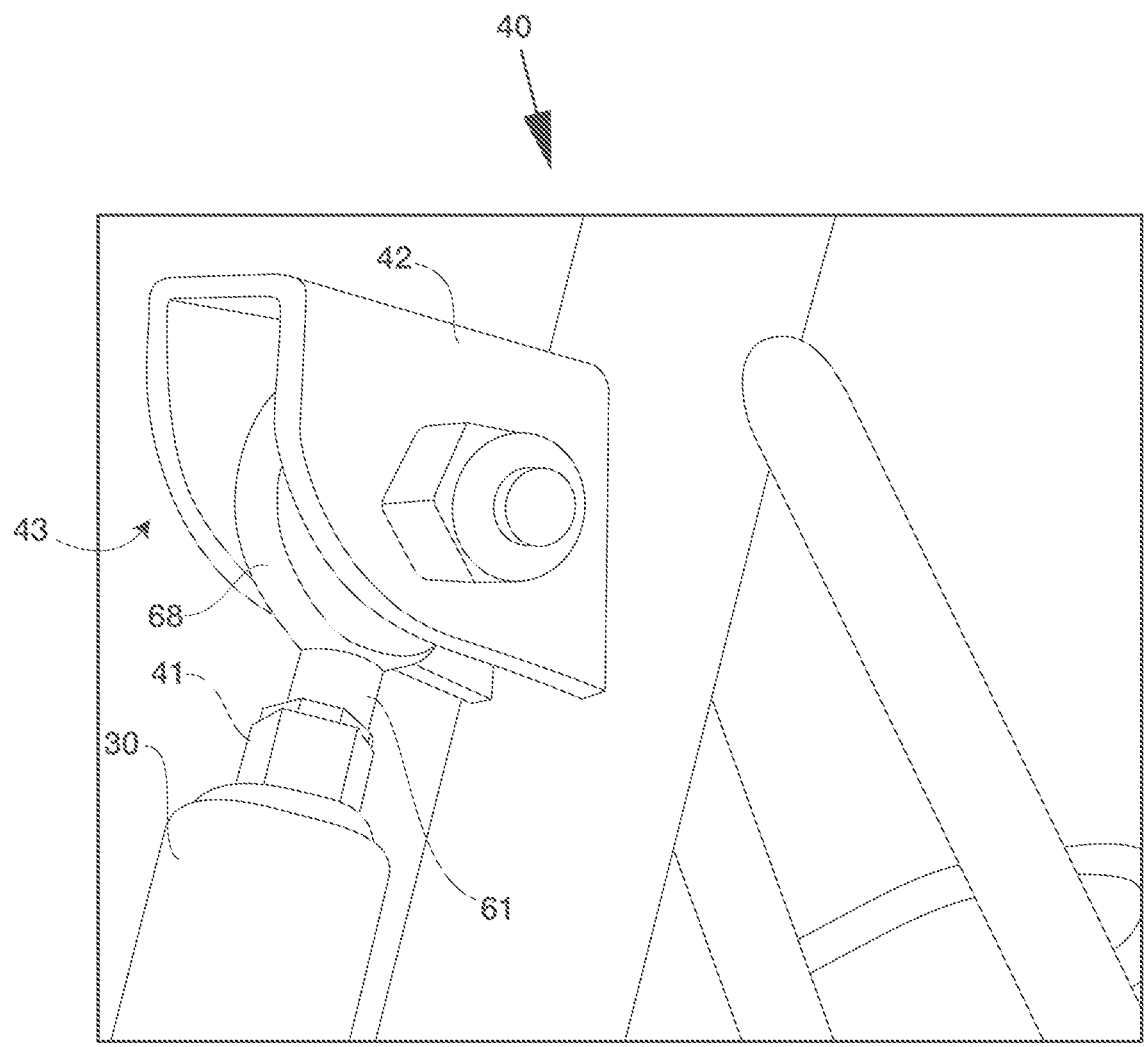
FIG. 11 shows a close up side perspective view of a second end at the hinge joint according to embodiments of the present disclosure.
Figure 12:
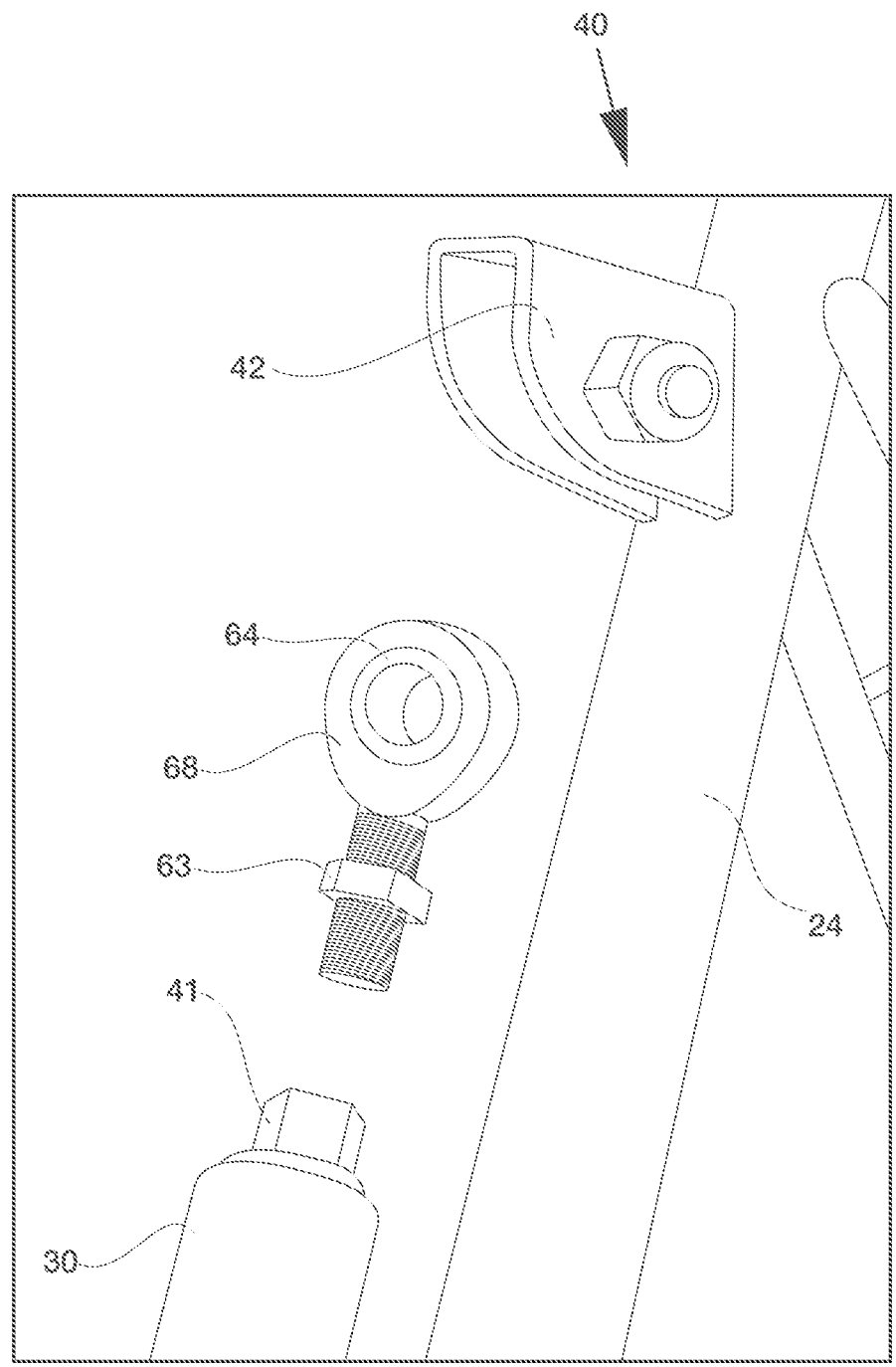
FIG. 12 shows an exploded view of one example of a second end at the hinge joint according to embodiments of the present disclosure.
Figure 13:
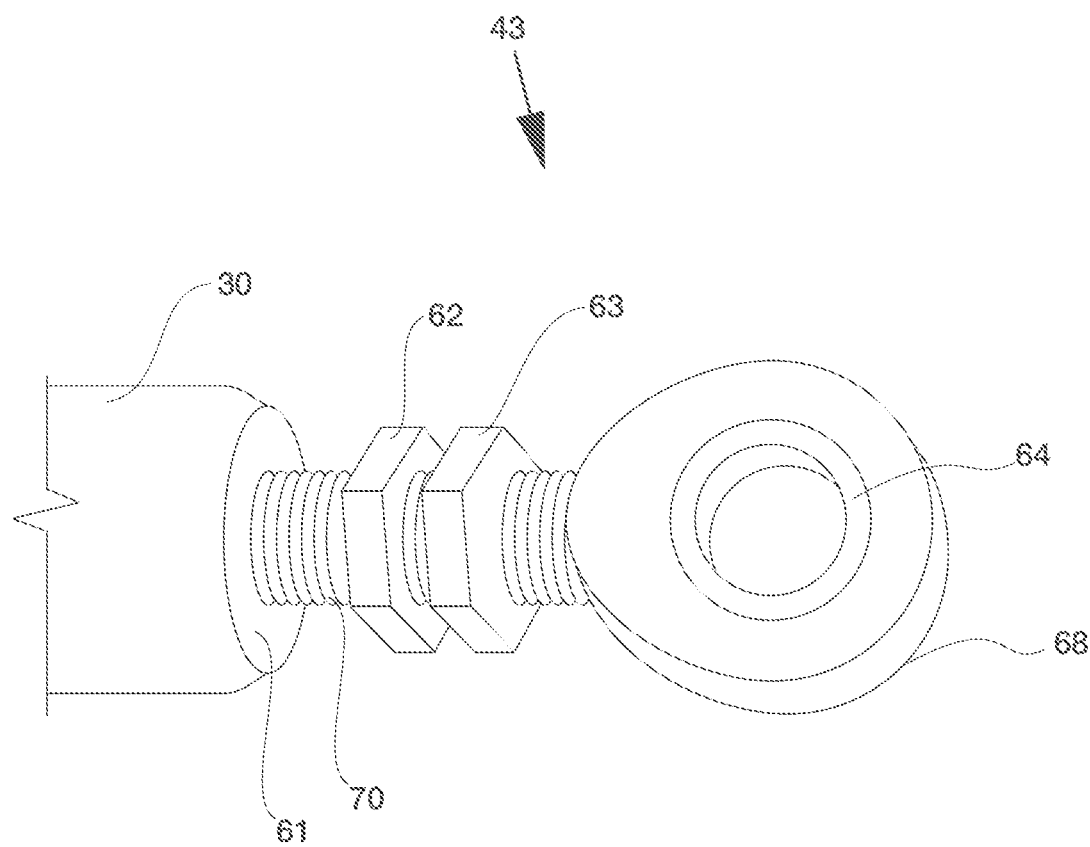
FIG. 13 shows an isolated view of a portion of a hinge joint according to embodiments of the present disclosure.

Top tube 30 at first end 32 may include tube slot 34, one example of which is seen in FIGS. 5 and 9. Tube slot 34, in one embodiment, may be an extension of and/or integrally formed part of tube 30. Tube slot 34 may include an inner opening. Tube slot 34 may fit with receiver 35. Receiver 35 may be a part of top tube 30. Receiver 35 may be integrally formed and/or mated with top tube 30. The inner opening in tube slot 34 may align with one or more openings in receiver 35. A pin 31 may fit through the inner opening that is aligned with the openings in the tube slot 34 and receiver 35, respectively. The pin 31, by way of example, may be a locking quick release pin. The pin 31 may be tethered to the bike 10 by way of a tether 31' so that when it is extracted from the receiver, it remains attached to the bike 10 and does not become prone to being lost.

Referencing generally FIGS. 6-8, and 10-13, the top tube 30 may include a hinge. Any type of hinged joint may be utilized at second end 40. By way of example, a heim joint may be used to form a hinged joint. The heim joint may be integrally formed or mated with the top tube 30. In one example of a heim joint, reference the exploded view of end 40 of FIG. 12, the heim joint 43 may include a part that protrudes from or is attached to the top tube 30. A connector 41 may interface with the heim joint. The heim joint provides for lateral and vertical play to provide easy lowering of the first end of the top tube 30. The heim joint 43 may meet with sleeve 42. A ball swivel of heim joint 43 may align with openings in the sleeve 42 with a securing element, by way of example, a bolt that interlocks the heim joint 43 within the sleeve 42. If a more rigid hinge is desired, other forms of hinge joints may be utilized and are considered within the scope of the inventions. In some examples, a bolt may extend through openings in sleeve 42 and interlace through connector 41 to form a hinge joint in end 40.

Examples of heim joint 43 may include a first nut 61 welded in place inside or attaching to top tube 30 tubing. The tubing may be rounded over for extra strength at the end. A shaft 70 of the joint may screw into the nut. There may be a second nut 62 and, in some embodiments, a third nut 63 along the shaft 70. The joint can be tightened or loosened by turning the joint shaft. The shaft 70 may be locked in place by tightening both the nuts together against the tubing. The joint includes a head 68 on the joint shaft 70 with the head having an interior ball swivel 64 including a central opening.

The top tube 30 may include an adjustment factor wherein turning the top tube 30, for example clockwise, may slightly shorten or lengthen the overall top tube length, and vice versa. This adjustment factor allows for custom, secure fit of the top tube 30 with the top tube being adjustable and foldable. In some examples, heim joint 43 is adapted with securing nuts that may be loosened to allow top bar 30 to be rotated to lengthen and counter rotated to be shortened and then retightened at the nut to produce a custom, slightly adjustable due to rotation, top bar with an augmented secure fit when in use in the horizontal position.

In certain embodiments, a bicycle 10 includes a top tube 30. The top tube 30 includes two breaks along a top tube length. The two breaks may be spread apart toward the distal ends of top tube 30. The two breaks are configured to work together to allow a portion of the top tube 30 to become misaligned and/or retracted to provide more step through space in the bicycle 10. In some examples, the step through space is at least 6 inches greater than with conventional bicycles. In other examples, there is provided an increased step through space of at least 1 inch, and in some examples of more than 5 inches. In some examples, the bicycle 10 includes a lowered step through space relative to the barrier to mounting created by the top tube 30.

Some examples of bicycle 10, include a top tube 30, the top tube 30 including a drop end. The top tube 30 including a drop end may increase the weight of the overall bicycle 10 by 20 or less ounces, in some embodiments. In some examples, the added weight of top tube 30 may be less than 2 lbs. This increased weight is far less than the additional 5-8 lbs. often added to provide stability in a step-through frame bicycle.

A top tube 30 including a drop end may be installed as an aftermarket part. A top tube including a drop end may be installed as original equipment with the bike frame.

In some examples, a top tube first end or second end may include a joint and the other of the first or second ends includes a separation and drops out of alignment with the other top tube portions. The movable portion may drop to decrease a step over height requirement lower than a step over height requirement when all the top tube portions are aligned. The step over height requirement may be greater when the top tube is in the first position than when the top tube is in the second position. A step over height requirement may be considered the height of a top tube in a first position or riding position, measured from the ground to the top of the top tube (for example, the clearance needed to mount a bicycle). While bicycle heights and sizes may vary, the measurements remain consistent proportionally as to any given bicycle.

Examples may include a bicycle 10 having a bicycle frame 12. Referencing FIGS. 1-2, the bicycle frame 12 may include a top tube 30 that is displaceable from the frame 12 in at least one place, the top tube 30 forming a riding plane P1 in a first position and a mounting plane P2 in a second position when the top tube 30 is displaced. The top tube 30, in this example, alternates between the first position and the second position, and the mounting plane P1 is lower on the bicycle frame 12 than the riding plane P2, forming a larger mounting space MS. A mounting space MS may be formed by a mountable area between the head tube 14, down tube 18, and seat tube 24, with the top tube 30 forming an upper border of the mountable area along riding plane P1 and determining the amount of the mountable space MS available to a bicycle rider. A larger mounting space MS may be available during mounting when the top tube 30 is in the second position.

In this example, a distance D2 is formed between a ground plane P3 and a mounting plane P2, D2 equating to the distance between a ground surface (at P3) and the lowest available part of the mountable space MS (at P2). Embodiments may include a distance D2 of between 12" to 15", and in other examples D2 may be less than 16" and in other examples less than 15". Distance D2 is reduced in examples of the invention when the top bar 30 is in the second position.

A distance D1 is formed between riding plane P1 and mounting plane P2. In some examples, distance D1 may be at least 8" of increased mounting space MS available to a rider when the top bar 30 is in the second position. Some embodiments of the invention increase the mountable space MS by at least 4" and other embodiments increase the mountable space MS by at least 5" or more along D1.

In other embodiments, a bike 10 may include a top drop tube 30, wherein the stack measurement for any given bike (vertical distance from the bottom bracket to the center of the top of the head tube) is at least double that of a measurement of a drop height (vertical distance from the bottom bracket to the tube slot 34 when the tube slot is in a dropped, second position).

In still other embodiments, a measurement vertically between the bottom bracket to the tube slot 34 of any given bike is greater when the top tube 30 is in the first position than a measurement vertically between the bottom bracket to the tube slot 34 when the top tube 30 is in the second position.

In other embodiments, the disclosure includes a method for easy bicycle mount according to combinations of any of the embodiments of the present disclosure. In some examples, the disclosure includes a method for a bicycle drop top tube. A user may release a top tube 30 from the horizontal, in-use position, for example by lowering a section of top tube 30. The user may step through and onto the bike and then re-position top tube 30 into the in-use position and stabilize the top bar, by way of example, by aligning the tube slot 34 with the receiver 35. It is contemplated that the tube slot 34 may align with receiver 35 by aligning from movement from a top, bottom or side of tube slot 34.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

The invention claimed is:

1. A bicycle comprising:
    a bicycle frame including a substantially triangular mounting space,
    the bicycle frame including a top tube with a first end and a second end, wherein the first end is a releasable end and the second end is a pivotable end including a heim joint, wherein the top tube is displaceable from the frame at the releasable end,
    the top tube forming a riding plane in a first position and a mounting plane in a second position, and
    wherein the top tube alternates between the first position for riding and the second position for mounting, and the mounting plane is lower on the bicycle frame than the riding plane, forming a larger mounting space;
    wherein the releasable end includes a horizontal movement path prior to a vertical movement path when moving from the first position for riding to the second position for mounting.

2. The bicycle of claim 1, wherein the heim joint provides lateral movement and vertical movement to the top tube to enable the top tube to release into the horizontal movement path and the vertical movement path.

3. The bicycle of claim 1 wherein a measurement vertically between a bottom bracket to the releasable end is greater when the top tube is in the first position than a measurement vertically from the bottom bracket to the releasable end when the top tube is in the second position.

4. The bicycle of claim 1, wherein a distance (D1) is formed between the riding plane and the mounting plane, and the distance (D1) increases as a drop distance of a movable portion as the top tube drops.

5. The bicycle of claim 4, wherein as the distance (D1) increases and the movable portion drops, a step over height requirement decreases.

\* \* \* \* \*